(12) United States Patent
Janarthanam et al.

(10) Patent No.: US 7,970,528 B2
(45) Date of Patent: Jun. 28, 2011

(54) GASEOUS FUEL MANAGEMENT SYSTEM FOR AUTOMOTIVE VEHICLE

(75) Inventors: Suriyaprakash Janarthanam, Westland, MI (US); John R. Blankenship, Dearborn, MI (US); Steven J. Szwabowski, Northville, MI (US); Anthony G. Grabowski, Sterling Heights, MI (US); Arun Kumar Jaura, Anna Nagar (IN); Theodore J. Filippi, Trenton, MI (US); Michael Brown, Webberville, MI (US); Richard E. Soltis, Saline, MI (US); John R. Grabowski, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 1114 days.

(21) Appl. No.: 10/566,029

(22) PCT Filed: Jun. 24, 2004

(86) PCT No.: PCT/US2004/020132
§ 371 (c)(1), (2), (4) Date: Apr. 9, 2007

(87) PCT Pub. No.: WO2005/016674
PCT Pub. Date: Feb. 24, 2005

(65) Prior Publication Data
US 2007/0256737 A1 Nov. 8, 2007

Related U.S. Application Data

(60) Provisional application No. 60/490,307, filed on Jul. 25, 2003, provisional application No. 60/549,617, filed on Mar. 3, 2004.

(51) Int. Cl.
*G06G 7/70* (2006.01)
(52) U.S. Cl. .................. 701/114; 123/321; 137/386
(58) Field of Classification Search .............. 123/312, 123/351, 386, 516–519, 587; 701/101–105, 701/108, 110, 112–115
See application file for complete search history.

(56) References Cited

U.S. PATENT DOCUMENTS

| | | | |
|---|---|---|---|
| 5,501,200 A * | 3/1996 | Bogartz | 123/527 |
| 6,276,343 B1 * | 8/2001 | Kawamura et al. | 123/520 |
| 6,308,692 B1 * | 10/2001 | Ishikawa et al. | 123/519 |
| 6,634,342 B1 * | 10/2003 | Wouters et al. | 123/516 |
| 6,830,040 B1 * | 12/2004 | Toyoda | 123/520 |
| 7,207,209 B2 * | 4/2007 | Mitani et al. | 73/49.7 |
| 2002/0148354 A1 * | 10/2002 | Amano et al. | 96/112 |
| 2004/0226543 A1 * | 11/2004 | Penschuck | 123/518 |
| 2005/0011185 A1 * | 1/2005 | Annoura et al. | 60/289 |

* cited by examiner

*Primary Examiner* — John T Kwon
*Assistant Examiner* — Johnny H Hoang
(74) *Attorney, Agent, or Firm* — Jerome R. Brouillard; Julia Voutyras

(57) ABSTRACT

A gaseous fuel management system for an automotive vehicle includes at least one gas sensor for detecting the presence of gaseous fuel outside of the confines of the vehicle's fuel storage tank, fuel lines, and prime mover. In the event that fugitive gas is detected and the concentration exceeds a predetermined threshold, the fuel supply to the vehicle's prime mover will be shut off and, if so equipped, the vehicle may then be operated in a battery power mode for the convenience of the driver.

30 Claims, 4 Drawing Sheets

GASEOUS FUEL MANAGEMENT SYSTEM FOR AUTOMOTIVE VEHICLE

This application claims the benefit of U.S. Provisional Application No. 60/490,307 filed Jul. 25, 2003 and U.S. Provisional Application No. 60/549,617 filed Mar. 3, 2004.

BACKGROUND OF THE INVENTION

1. Field of the Invention

The present invention relates to a system for distributing and otherwise handling gaseous fuel provided to the prime mover of an automotive vehicle.

2. Disclosure Information

Vehicle designers are accelerating a trend toward the use of gaseous fuel in the ever increasing quest for improved fuel economy and lower emissions. Although offering several advantages, gaseous fuel presents an unique set of challenges to designers, including the sometimes difficult handling of fugitive emissions of gaseous fuel. For example unwanted releases of hydrogen are not readily detectable by smell or sight, and as a result, is desirable to use electronic detection means for monitoring fugitive hydrogen and to build into a vehicle a system providing appropriate measures to mitigate the effects of unwanted discharges of hydrogen or other gaseous fuels such as natural gas or liquefied petroleum gas.

U.S. Pat. No. 6,290,594, which is assigned to the assignee of the present invention, discloses a system for measuring fugitive hydrogen within a fuel cell equipped vehicle having fans for reducing the concentration of free hydrogen gas within the interior spaces of the vehicle. The '594 patent does not, however, cut off the fuel supply from the gaseous fuel storage tank in the event that fugitive hydrogen is detected, nor does the system of the '594 patent provide a loss of strategy mode allowing the driver of a hybrid vehicle equipped with both an internal combustion engine powered by hydrogen or another gaseous fuel, as well as a traction motor/generator, to operate with vehicle with the motor/generator for a limited period of time in the event that a concentration of fugitive hydrogen or other gaseous fuel detected within any one of various spaces within a vehicle warrants deactivation of the vehicle's prime mover.

SUMMARY OF THE INVENTION

A gaseous fuel management system for an automotive vehicle having a passenger cabin and a prime mover has a fuel system including a gaseous fuel storage tank and a fuel line for conveying gaseous fuel from the storage tank to the prime mover. The fuel line has at least one electronically controlled valve for controlling the flow of gaseous fuel in the fuel line. A fuel management controller operatively connected with the electronically controlled valve closes the valve in the event that a gas sensor which is installed within the vehicle detects the present of fugitive gaseous fuel outside of the confines of at least one of the gaseous fuel storage tank, or the fuel line, or the prime mover. According to the present invention, the prime mover may include an internal combustion engine, a fuel cell, an internal combustion engine coupled with a traction motor/generator, or other fuel-consuming prime movers known to those skilled in the art and suggested by this disclosure.

A fuel management system according to the present invention preferably further includes at least one atmospheric circulator operated by a fuel management controller in response to a gas detection signal from a gas sensor. The atmospheric circulator may include either a blower or a fan or other device for moving atmospheric air through a space in the vehicle so as to remove fugitive fuel gas from the space being ventilated. The passenger compartment of the vehicle may be ventilated by operatively connecting at least one window in the passenger cabin or passenger compartment to the fuel management controller such that the window, which may be a side window, or sunroof, or other movable closure panels, may be opened in the response to a gas detection signal from the gas sensor. In this respect, the term 'glazing panel' means either a vision unit, such as a window, or a translucent or opaque movable panel which may be used for ventilating the passenger compartment of a vehicle.

In the event that a prime mover according to the present invention includes an internal combustion engine, the fuel management controller will place and maintain one or more electronically controlled fuel valves in a closed position in the event that an appropriate gas detection signal is present from the gas sensor. Other actions may be taken in the event that a higher level gas detection signal is present. For example, the fuel management controller may prevent recharging in the traction battery, if the vehicle so equipped, or prevent refueling of the vehicle. Further, as noted above, in the event that the gas detection signal is present, the fuel management controller may close an electronically controlled fuel tank valve so as to disable the vehicle's engine, while at the same time permitting the vehicle to continue operating with a traction motor/generator.

According to a preferred embodiment of the present invention, it is contemplated that a plurality of gas detection sensors may be employed with a vehicle. Sensors may be positioned inside an enclosure within which the fuel storage tank is mounted, as well as within an engine compartment or prime mover compartment. Additional sensors may be located within the passenger cabin and also within an enclosure within which the traction battery is located. In a further preferred embodiment, at least one ventilation duct will be situated such that the first end of the duct is connected to an enclosure within which the fuel storage tank is mounted, with a second end of the duct being connected to an air extractor mounted to an external surface of an automobile, whereby any fugitive gaseous fuel entering the fuel tank enclosure from the fuel storage tank will be extracted from the enclosure by air flowing past the surface of the body when the vehicle is moving. This is a so-called passive type of device, as is the use of ventilation apertures formed in an upper portion of the prime mover compartment such that air will be allowed to flow through the prime mover compartment while removing fugitive fuel gas emissions.

According to another aspect of the present invention, a method of operating a gaseous fuel automotive vehicle having both a prime mover fueled by gaseous fuel, and a traction motor/generator, includes the steps of providing a passive ventilation system to mitigate any significant buildup of fugitive fuel gas within various spaces within the vehicle, and monitoring at least one interior space of the vehicle so as to determine the presence of fugitive fuel gas within the space, by means of at least one electronic sensor. The method also includes the provision of at least one atmospheric circulator, such as a fan or blower, for supplying ambient air to at least one space within the vehicle, while disabling operation of the prime mover and allowing operation of the traction motor/generator, so as to purge the interior space which the circulator services while allowing the driver limited operation using the traction motor and traction battery.

Additional steps according to the present inventive method include opening movable glazing in the passenger compartment of the vehicle, and closing a fuel supply valve located between a gaseous fuel tank and the prime mover. In the event that either the electronic gas sensor system becomes inoperative, or if a predetermined fugitive fuel gas concentration threshold is exceeded, the prime mover will be disabled by cutting off its fuel supply, while allowing operation of the traction motor/generator, and while simultaneously operating at least one atmospheric circulator so as to purge an interior space of the vehicle.

It is an advantage of the present invention that fugitive fuel gas emissions may be handled in a manner which maintains the fuel economy of the vehicle while at the same time, enhancing the vehicle's reliability.

It is an advantage of the present invention that the present gaseous fuel management system may be employed with hydrogen, or natural gas, or liquefied petroleum gas, and may be used in vehicles having as a prime mover either a fuel cell, or an engine-motor/generator combination, or solely an engine, or yet other types of fuel-consuming prime mover.

Other advantages, as well as objects and features of the present invention, will become apparent to the reader of this specification.

DETAILED DESCRIPTION OF THE PREFERRED EMBODIMENTS

Figure 1:
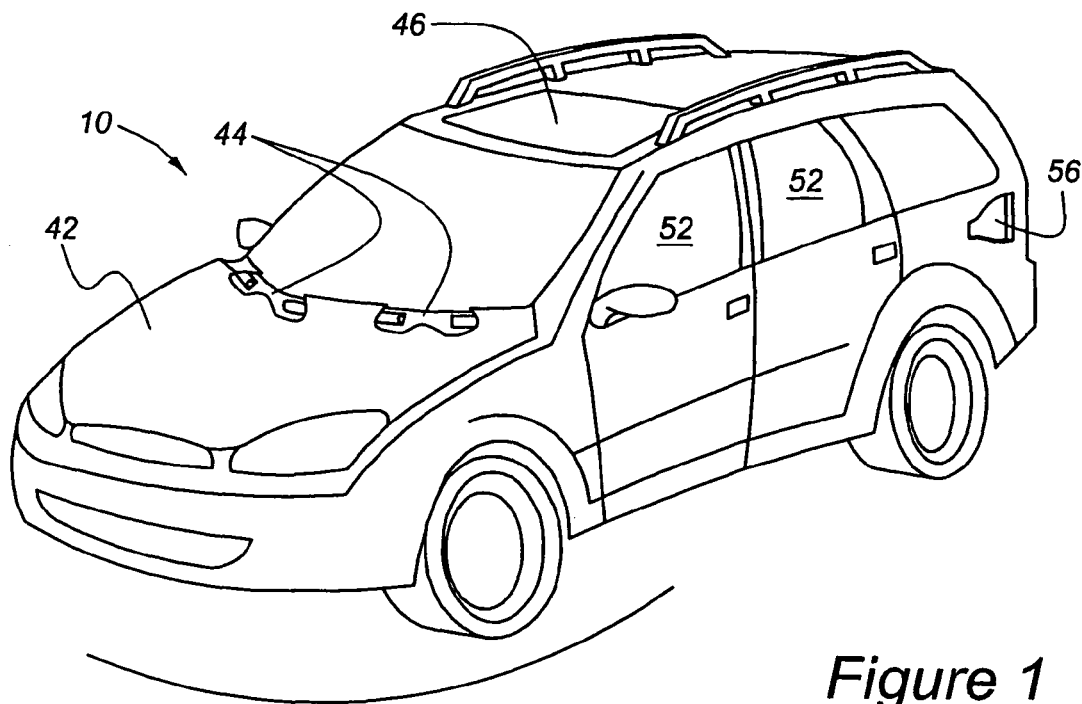
FIG. 1 is a perspective view of a vehicle having a fuel management system according to the present invention.
Figure 2:
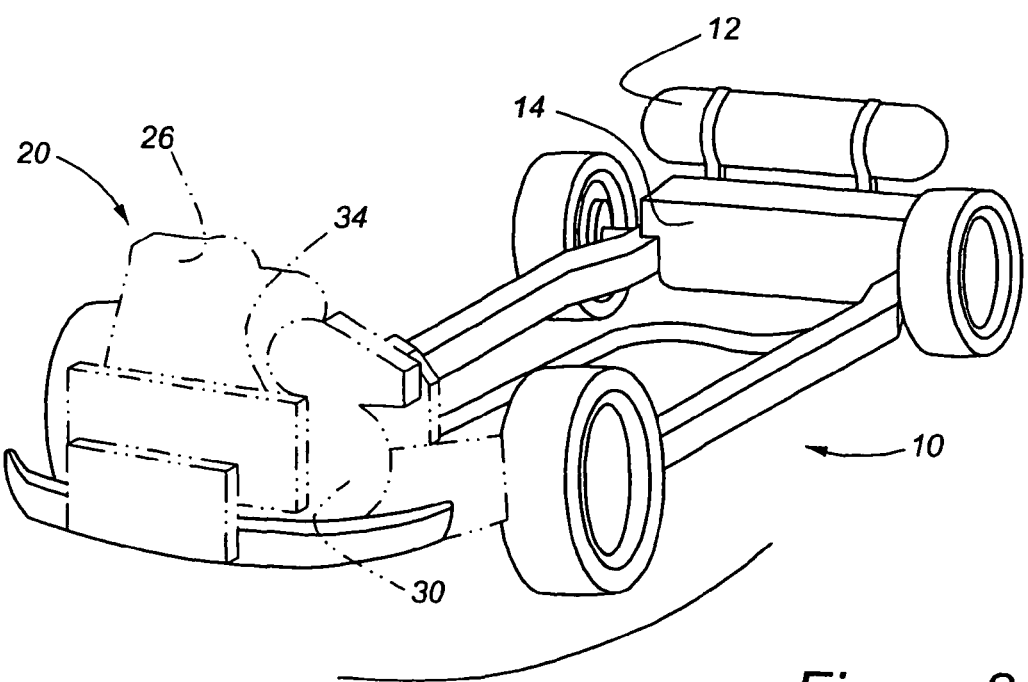
FIG. 2 is a perspective view of a chassis of the vehicle of FIG. 1, showing various components associated with the present system and method.

As shown in FIG. 1, vehicle 10 has several movable glazing units such as side window 52 and moon roof 46. Vehicle 10 also has a series of vents 44 formed in the trailing edge of engine compartment hood 42. Finally, vehicle 10 has NACA scoop 56 formed on the driver's (left) side quarter panel and an accompanying NACA scoop formed on the passenger side (right) quarter panel. When vehicle 10 is in motion, air is drawn from the interior of vehicle 10 by the aerodynamic action of the NACA scoops. This feature provides a portion of a passive ventilation system, as does the ventilation provided by vents 44. As shown in FIG. 2, the chassis of vehicle 10 has fuel tank 12, which is a compressed and/or liquefied gas fuel tank suitable for any one of natural gas, hydrogen, liquefied petroleum gas, or other compressed and/or liquefied fuel gases. As used herein, the term 'gaseous fuel' means either a fuel which is stored either in a single phase as a compressed gas or as a two-phase compressed gas and liquid.

Traction battery 14 is mounted adjacent gaseous fuel storage tank 12, and gas or liquid from the fuel tank 12 and electrical energy from traction battery 14 move to the front of vehicle 10 where prime mover 20 is situated.

Figure 3:
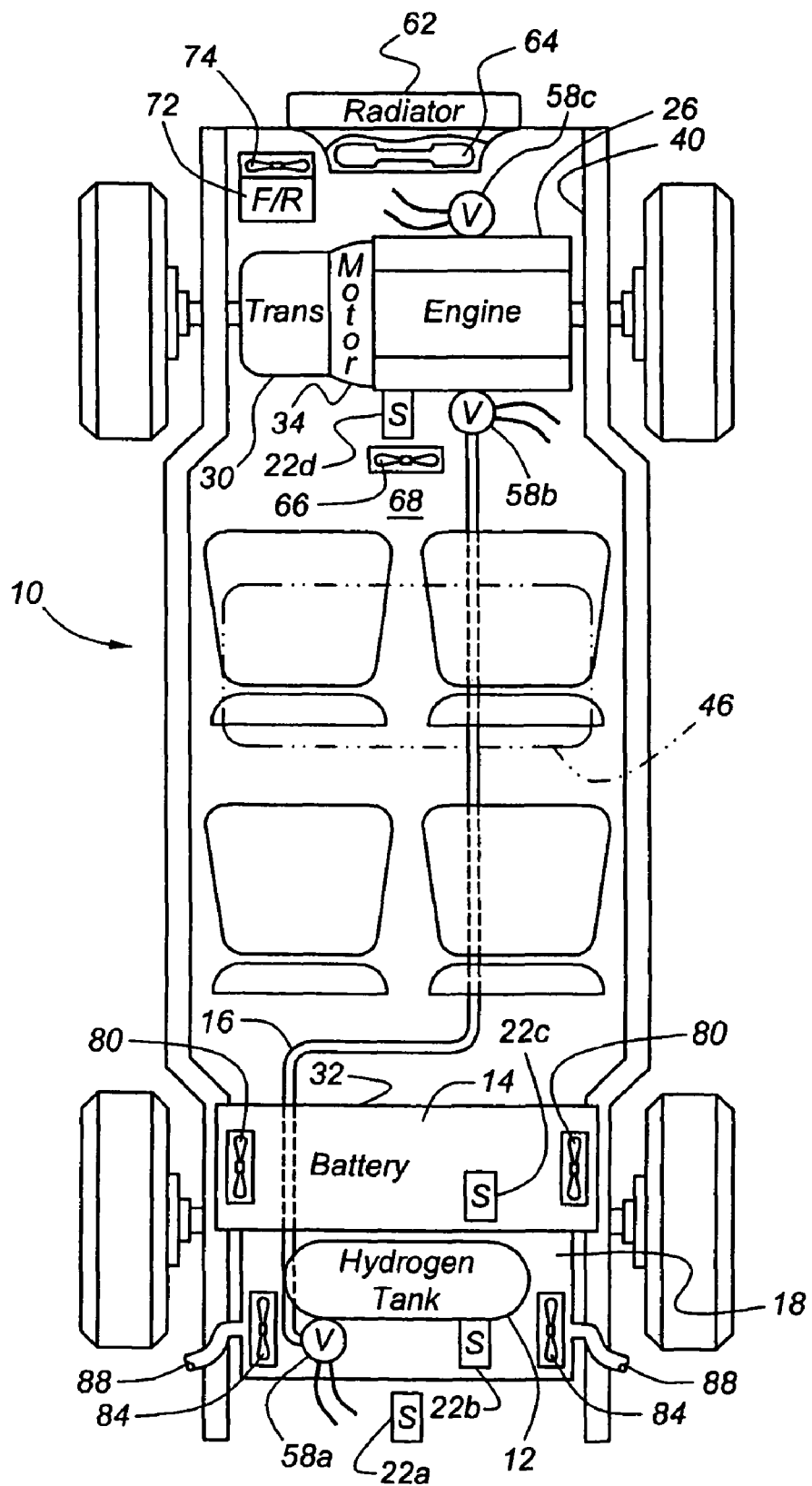
FIG. 3 is a plan view of the vehicle of FIGS. 1 and 2.

Prime mover 20 may have an engine, 26, with or without a traction motor/generator, 34, coupled to a transmission 30, as is shown in FIG. 3. Alternatively, prime mover 20 may include a fuel cell and an associated traction motor/generator, or an internal combustion engine without an associated traction motor/generator.

Gaseous fuels are generally buoyant in air, and the use of venting via moon roof 46 and engine compartment vents 44 will take advantage of this natural buoyancy. These are passive ventilation devices, as are the use of NACA scoops to pull air through fuel tank enclosure vent ducts 88 (FIG. 3). Ducts 88 have an inboard connection with fuel tank enclosure 18 and an outboard connection with one of the previously described NACA ducts. Gas sensor 22b, which is located within fuel tank enclosure 18, detects the presence of gaseous fuel, in this case hydrogen, outside the confines of storage tank 12. As fully described below, fuel tank enclosure vent fans 84 are used to ventilate tank enclosure 18 in the event that an undesirable level of gaseous fuel is detected by means of sensor 22b. Those skilled in the art will appreciate in view of this disclosure that gas sensing and active and passive ventilation devices may be used as described herein, with appropriate adjustments for the lack of buoyancy.

Battery 14 is located within battery enclosure 32, which is ventilated by means of battery compartment fans 80 which, as is the case with fuel tank enclosure vent fans 88, will be activated in the event that a concentration of fugitive fuel gas exceeding a threshold value is detected by means of sensor 22c. Climate control fan 66 is mounted within passenger compartment 68 and is energized in the event that sensor 22a senses fugitive gas within the passenger compartment. Similarly, radiator fan 64, which services engine cooling radiator 62 is turned on in the event that sensor 22d senses fugitive gaseous fuel within engine compartment 40.

Fuse and relay box 72, which contain high voltage relays for operating traction motor/generator 34, is equipped with ventilation fan 74 which will be turned on as described below.

Figure 4:
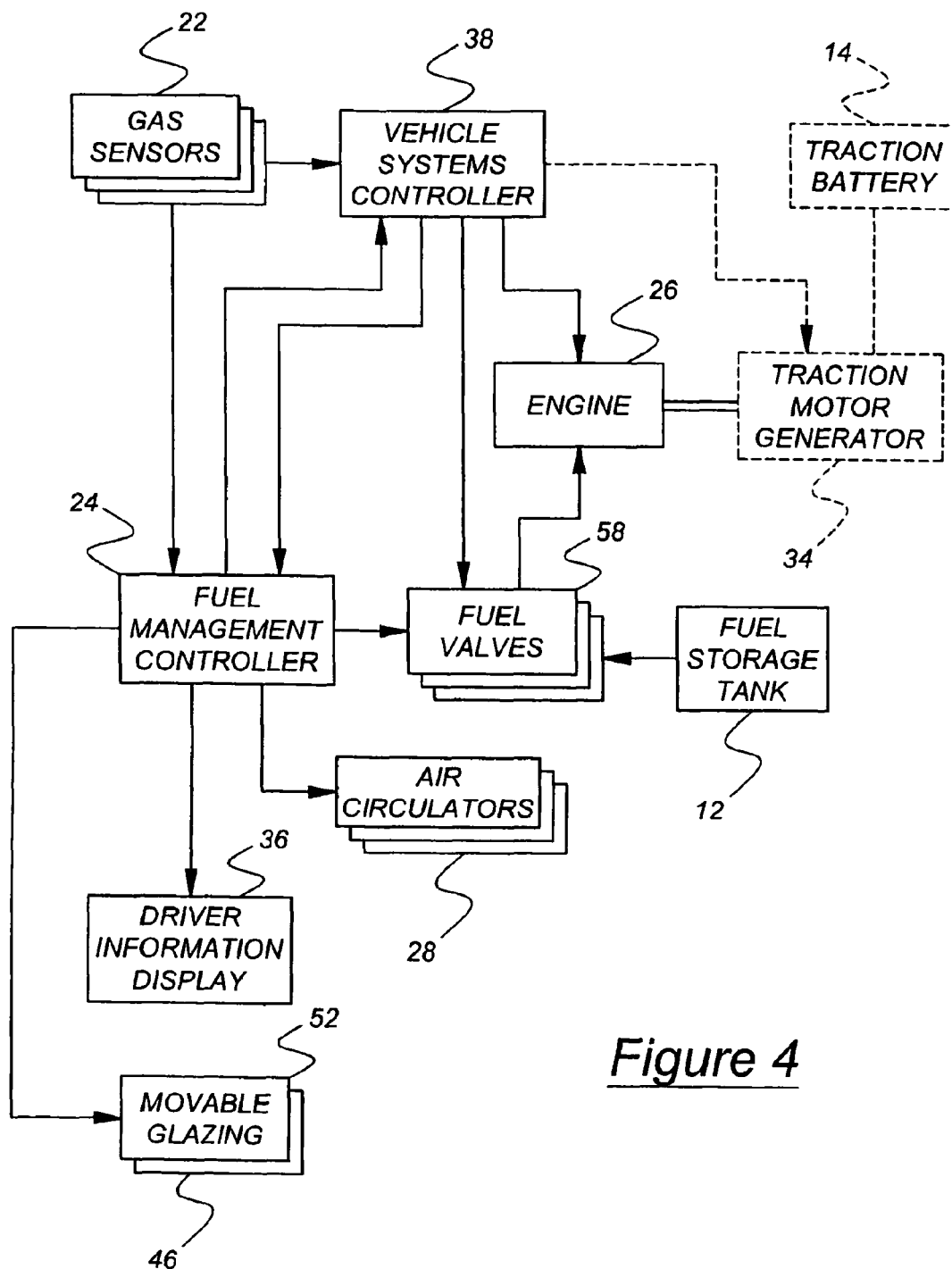
FIG. 4 is a system block diagram showing various components of a gaseous fuel management system according to the present invention.

As shown in FIG. 4, vehicle 10 further includes driver information display 36 which is operated by fuel management control 24. Driver display 36 includes a two-color lamp visible from both inside and outside vehicle 10. If the lamp is green, this means that no fault has been detected within the fuel handling system. If the lamp is red, this means that either fugitive gas has been detected at a concentration above a threshold concentration, or that one or more of sensors 22 is out of specification. Driver information display 36 further includes an audible warning device which is activated if a higher level of fugitive gas is detected.

As shown in FIG. 4, fuel management controller 24 operates movable glazing 46 and 52, as well as air circulators 28, which include various air circulators for tank enclosure 18, battery enclosure 32, passenger compartment HVAC fan 66, and engine compartment cooling fan/radiator cooling fan 64. Fuel management controller 24 receives signals from gas sensors 22a-22d and is operatively connected with vehicle system controller 38, which has supervisory functional control over engine 26 and traction motor/generator 34. Fuel management controller 24 also operates the fuel valves 58a-58c.

Figure 5:
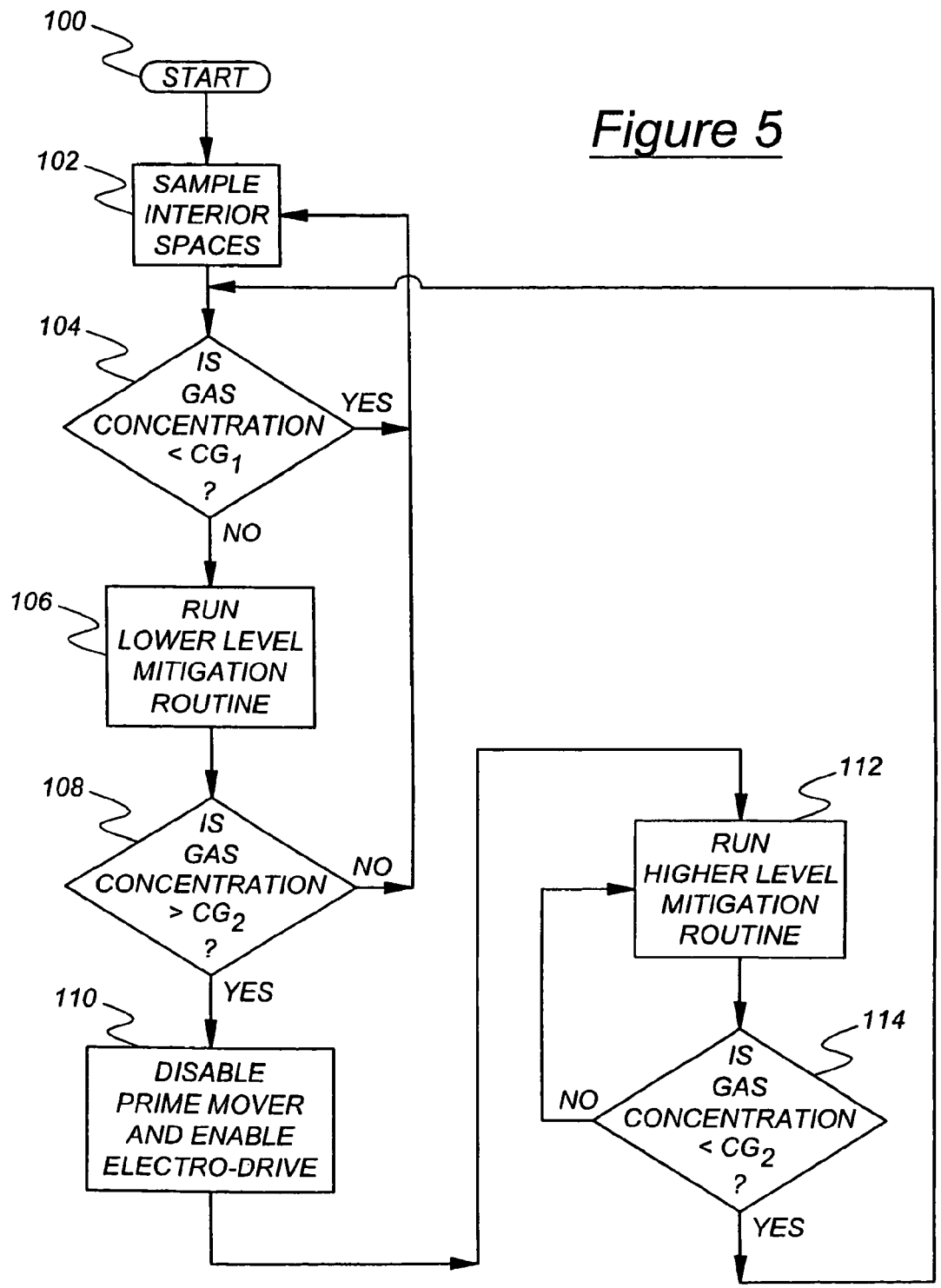
FIG. 5 is a flow chart showing a portion of operation of a gaseous fuel management system according to the present invention.

As shown in FIG. 5, a method according with the present invention starts at block 100. At block 102, fuel management controller 24 operates gas sensors 22a-d to sample interior spaces within vehicle 10. The inventors of the present invention have determined that silicon micromachined gas sensors produced by Makel Engineering of Chico, Calif., and having the model designation 02HDS021 are useful for practicing this invention.

At block 104, the measured concentrations of fugitive fuel gas, if any, are matched with a lower concentration threshold, $CG_1$. In the event that the fugitive gas concentration is less than $CG_1$, the routine continues sampling at block 102. If however, the concentration exceeds $CG_1$ at block 104, the routine moves to block 106 wherein a lower level mitigation routine is run.

The lower level mitigation routine at block 106 includes opening movable glazing such as moon roof 46 or side windows 52, discontinuing high voltage charging of traction battery 14, and alerting the driver that fugitive fuel has been detected. Also, fuel tank enclosure fans 84 and battery enclosure fans 80 will be turned on. If a leak is detected in the passenger cabin, climate control fan 66 will be operated. If fugitive fuel gas is detected in the engine compartment, engine cooling fan 64 will be operated, and climate control fan 66 will be disabled. Also, vehicle refueling will be prevented.

After the lower level mitigation routine has began at block 106, the routine moves to block 108 wherein the measured gas concentration from sensors 22*a-d* is compared with a upper threshold $CG_2$. If the gas concentration is not greater than $CG_2$, the lower level mitigation routine will continue, until the concentration of gas drops below threshold $CG_1$. If at block 108, the gas concentration exceeds $CG_2$, the routine moves to block 110 wherein the prime mover 20 will be disabled by cutting off fuel by means of fuel cut-off valves 58*a, b* and *c*. This will serve to mitigate any fuel system integrity problem existing in fuel line 16 which conveys either gas or liquid between fuel tank 12 and prime mover 20, as well as any fuel handling problem located within the prime mover.

Having disabled the prime mover at block 110, fuel management controller 24 moves to block 112, where a higher level mitigation routine is run. This high level routine includes such steps as making certain that fuel tank solenoid valves 58 *a, b* and *c* are closed under all conditions, and also includes maintaining the operation of vent fans 80 and 84. Once fuel solenoid valves 58*a-c* are closed, they cannot be reopened until a manual reset is accomplished by the vehicle's operator.

As noted at block 110, when prime mover 28 is disabled, engine 26 will not receive any fuel, and as a result, a limited operating strategy or limp-home mode will be started with traction motor/generator 34, which will allow the vehicle to be driven with only electrodrive capability for a limited period of time, as a convenience for the driver. At block 114, the routine of FIG. 5 continues with the running of the higher level mitigation routine until the concentration of fugitive gas is below $CG_2$. If the measured concentration of fuel gas is below $CG_2$ at block 112, the routine moves to block 104 and continues with a comparison of the measured gas concentration with $CG1_1$. The method of FIG. 5 preferably runs whenever vehicle 10 has fuel on board.

Although the present invention has been described in connection with particular embodiments thereof, it is to be understood that various modifications, alterations, and adaptations may be made by those skilled in the art without departing from the spirit and scope of the invention set forth in the following claims.

What is claimed:

1. A gaseous fuel management system for an automotive vehicle having a passenger cabin and a prime mover, with said fuel management system comprising:
   a gaseous fuel storage tank;
   a fuel line for conveying gaseous fuel from said storage tank to said prime mover, with said fuel line having at least one electronically controlled valve for controlling a flow of gaseous fuel in the fuel line;
   at least one gas sensor for detecting a presence of gaseous fuel outside of the confines of at least one of said storage tank, said fuel line, and said prime mover, with said sensor emitting a gas detection signal if a concentration of fuel gas above a predetermined threshold level is detected;
   a fuel management controller operatively connected with said electronically controlled valve and said gas sensor, with said controller closing said electronically controlled valve in the event that said gas sensor emits said gas detection signal.

2. A gaseous fuel management system according to claim 1, wherein said prime mover comprises an internal combustion engine.

3. A gaseous fuel managementsystem according to claim 1, wherein said prime mover comprises an a fuel cell.

4. A gaseous fuel management system according to claim 1, further comprising at least one atmospheric circulator operated by said fuel management controller in response to said gas detection signal from said gas sensor.

5. A gaseous fuel management system according to claim 1, wherein said fuel management controller opens at least one window in said passenger cabin in response to said gas detection signal from said gas sensor.

6. A gaseous fuel management system according to claim 1. wherein said at least one window comprises a moon roof in said passenger cabin.

7. A gaseous fuel management system according to claim 1, wherein said prime mover comprises an internal combustion engine, with said fuel management controller placing and maintaining said electronically controlled valve in a closed position in the event that said gas detection signal is present.

8. A gaseous fuel management system according to claim 1, wherein said prime mover comprises an internal combustion engine coupled to a traction motor/generator and to a transmission and traction battery.

9. A gaseous fuel management system according to claim 8, wherein said fuel management controller prevents recharging of said traction battery in the event that said gas detection signal is present.

10. A gaseous fuel management system according to claim 8, wherein said fuel management controller not only closes said electronically controlled valve in the event that said gas detection signal is present, but also permits said vehicle to continue operating with said traction motor/generator.

11. A gaseous fuel management system according to claim 1, wherein said gaseous fuel comprises hydrogen.

12. A gaseous fuel management system according to claim 1, wherein said gaseous fuel comprises natural gas.

13. A gaseous fuel management system according to claim 1, wherein said gaseous fuel comprises liquefied petroleum gas.

14. A gaseous fuel management system according to claim 1, further comprising a warning system for alerting a driver of said vehicle in the event that said gas detection signal is present.

15. A gaseous fuel management systcm according to claim 1, wherein said at least one gas detection sensor is located inside an enclosure within which said fuel storage tank is mounted.

16. A gaseous fuel management system according to claim 1, wherein said at least one gas detection sensor is located within a compartment within which said prime mover is located.

17. A gaseous fuel management system according to claim 1, wherein said at least one gas detection sensor is located within said passenger cabin.

18. A gaseous fuel management system according to claim 8, wherein said at least one gas detection sensor is located within an enclosure within which said traction battery is located.

19. A gaseous fuel management system according to claim 1, further comprising at least one ventilation duct having a first end connected to an enclosure within which said fuel storage tank is mounted and a second end connected to an air extractor mounted to an external surface of said automobile, whereby any gaseous fuel entering said enclosure from said fuel storage tank will be extracted from said enclosure.

20. A gaseous fuel management system according to claim 1, further comprising at least one ventilation aperture formed in an upper portion of a compartment within which said prime mover is located, whereby any gaseous fuel entering said compartment from said prime mover will be extracted from said enclosure.

21. An automotive vehicle, comprising:
a passenger cabin;
a prime mover comprising an internal combustion engine; and
a fuel management system comprising:
a gaseous fuel storage tank mounted within an enclosure having at least one atmospheric circulator associated therewith;
a fuel line for conveying gaseous fuel from said storage tank to said prime mover, with said fuel line having at least one electronically controlled valve for controlling a flow of gaseous fuel in the fuel line;
at least one gas sensor for detecting a presence of gaseous fuel outside of the confines of at least one of said storage tank, said fuel line, and said prime mover, with said sensor emitting a gas detection signal if a concentration of fuel gas above a predetermined threshold level is detected; and a fuel management controller operatively connected with said electronically controlled valve and said gas sensor, with said controller closing said electronically controlled valve and operating said at least one atmospheric circulator so as to ventilate said fuel storage tank enclosure in the event that said gas sensor emits said gas detection signal.

22. An automotive vehicle, comprising:
a passenger cabin;
a prime mover comprising an internal combustion engine coupled to at least a traction motor/generator; and
a fuel management system comprising:
a gaseous fuel storage tank mounted within an enclosure having at least one atmospheric circulator associated therewith;
a fuel line for conveying gaseous fuel from said storage tank to said prime mover, with said fuel line having at least one electronically controlled valve for controlling a flow of gaseous fuel in the fuel line;
at least one gas sensor for detecting a presence of gaseous fuel outside of the confines of at least one of said storage tank, said fuel line, and said prime mover, with said sensor emitting a gas detection signal if a concentration of fuel gas above a predetermined threshold level is detected;
a fuel management controller operatively, connected with said electronically controlled valve and said gas sensor, with said controller disabling said engine by closing said electronically controlled valve and operating said at least one atmospheric circulator so as to ventilate said fuel storage tank enclosure, while permitting continued operation of said vehicle with said traction motor/generator, in the event that said gas sensor emits said gas detection signal indicating a concentration of fuel gas in excess of a predetermined threshold.

23. An automotive vehicle according to claim 22, further comprising a plurality of movable glazing panels mounted to said passenger compartment and controlled by said fuel management controller such that said glazing panels are opened in the event that said gas sensor emits a gas detection signal.

24. A method of operating a gaseous fueled automotive vehicle having both a prime mover fueled by said gaseous fuel, and a traction motor/generator, comprising the steps of:
providing a passive ventilation system to mitigate any significant buildup of fugitive fuel gas emissions within said vehicle;
monitoring at least one interior space of said vehicle, so as to determine the presence of fugitive fuel gas within said space, by means of at least one electronic gas sensor;
providing at least one atmospheric circulator for supplying ambient air to said least one space within said vehicle; and
disabling operation of said prime mover, while allowing operation of said traction motor/generator, and operating said at least one atmospheric circulator so as to purge said at least one interior space of fugitive fuel gas, if fugitive gas is sensed while said vehicle is in operation.

25. A method according to claim 24, further comprising the step of opening movable glazing in a passenger compartment of said vehicle in the event that fugitive fuel gas is sensed.

26. A method according to claim 24, the disabling of said prime mover comprises at least the step of closing a fuel supply valve located between a gaseous fuel storage tank and said prime mover.

27. A method according to claim 24, further comprising the step of preventing said vehicle from being refueled in the event that fugitive gas is sensed within said at least one interior space.

28. A method according to claim 24, further comprising the step of disabling operation of said prime mover, while allowing operation of said traction motor/generator, and operating said at least one atmospheric circulator so as to purge said at least one interior space, in the event that said electronic gas sensor becomes inoperative.

29. A method according to claim 24, wherein said at least one atmospheric circulator is operated at in the event that fugitive fuel gas exceeding a first, lower, predetermined concentration is sensed, with said prime mover being disabled in the further event that fugitive fuel gas exceeding a second, higher, predetermined concentration is sensed.

30. A method according to claim 24, further comprising the step of warning a driver of the vehicle in the event that fugitive fuel gas is detected at a concentration above a predetermined threshold concentration.

* * * * *